United States Patent
Walsh et al.

(10) Patent No.: US 9,950,302 B1
(45) Date of Patent: Apr. 24, 2018

(54) STAND-ALONE CHEMICAL DISPENSER

(71) Applicant: Crossford International, LLC, Stamford, CT (US)

(72) Inventors: David L. Walsh, Stamford, CT (US); Joseph J. Franzino, Redding, CT (US)

(73) Assignee: Crossford International, LLC, Stamford, CT (US)

( * ) Notice: Subject to any disclaimer, the term of this patent is extended or adjusted under 35 U.S.C. 154(b) by 595 days.

(21) Appl. No.: 14/595,730

(22) Filed: Jan. 13, 2015

Related U.S. Application Data

(60) Provisional application No. 61/964,668, filed on Jan. 13, 2014.

(51) Int. Cl.
| | |
|---|---|
| *C02F 1/68* | (2006.01) |
| *B01F 1/00* | (2006.01) |
| *B01F 15/00* | (2006.01) |
| *B01D 11/02* | (2006.01) |
| *B01F 13/06* | (2006.01) |
| *B01D 15/02* | (2006.01) |

(52) U.S. Cl.
CPC ........ *B01F 15/00857* (2013.01); *B01D 15/02* (2013.01); *B01F 13/06* (2013.01); *B01F 15/00162* (2013.01); *B01F 15/00662* (2013.01); *C02F 1/685* (2013.01); *C02F 1/688* (2013.01); *B01F 2001/0094* (2013.01); *B01F 2215/0036* (2013.01)

(58) Field of Classification Search
CPC ............ B01F 15/00155; B01F 15/0016; B01F 15/00162; B01F 15/00188; B01F 15/0022; B01F 15/0027; B01F 15/00662; B01F 15/00831; B01F 15/00824; B01F 15/00857; B01F 15/00863; B01F 15/02; B01F 15/0201; B01F 15/0203; B01F 15/0216; B01F 13/06; B01F 2215/0036; B01F 2215/0052; B01F 1/00; B01F 2001/0061; B01F 2001/0072; B01F 2001/0077; B01F 2001/0094; B01F 15/0483; C02F 1/50; C02F 1/68; C02F 1/685; C02F 1/687; C02F 1/688; C02F 1/76; C02F 2201/002; B01D 17/12; B01D 2251/10; B01D 2251/108; B01D 2259/12; B01D 2259/124; B01D 2259/126; B01D 2259/128; B01D 11/02
USPC ... 366/150.1, 182.1, 182.2, 183.1, 314, 341; 210/94, 95, 198.1, 348, 753–756; 137/268; 422/261, 264, 274–279
See application file for complete search history.

(56) References Cited

U.S. PATENT DOCUMENTS

| | | | | | |
|---|---|---|---|---|---|
| 2,134,585 | A | * | 10/1938 | Seghers | A47J 36/10 220/324 |
| 3,416,897 | A | * | 12/1968 | Long | A47L 15/4436 137/268 |
| 3,474,817 | A | * | 10/1969 | Bates | B01F 1/0027 137/268 |
| 4,164,302 | A | * | 8/1979 | Gerdes | B60K 15/0409 220/210 |
| 5,076,315 | A | * | 12/1991 | King | B01F 1/0033 137/268 |
| 5,089,127 | A | * | 2/1992 | Junker | B01F 1/0027 210/167.11 |

(Continued)

*Primary Examiner* — Joesph Drodge
(74) *Attorney, Agent, or Firm* — Carson C. K. Fincham; Fincham Downs, LLC

(57) ABSTRACT

Systems, apparatus, and articles of manufacture for stand-alone chemical dispensers are provided.

6 Claims, 5 Drawing Sheets

(56) References Cited

U.S. PATENT DOCUMENTS

| | | | |
|---|---|---|---|
| 5,427,748 A * | 6/1995 | Wiedrich | B01F 1/0027 137/268 |
| 5,441,711 A * | 8/1995 | Drewery | B01F 1/0033 137/268 |
| 5,560,545 A | 10/1996 | Grogan et al. | |
| 5,593,648 A * | 1/1997 | Christie | A47L 15/4445 134/93 |
| 5,819,987 A | 10/1998 | Miller | |
| 5,884,820 A | 3/1999 | Thanisch et al. | |
| 6,116,472 A | 9/2000 | Wanbaugh et al. | |
| 6,138,703 A * | 10/2000 | Ferguson | B01F 1/0027 137/1 |
| 6,234,412 B1 | 5/2001 | von Schuckmann | |
| 6,471,141 B2 | 10/2002 | Smith et al. | |
| 6,641,003 B1 | 11/2003 | Foster et al. | |
| 6,669,061 B2 | 12/2003 | Tada | |
| 6,726,123 B2 | 4/2004 | Wang | |
| 6,729,560 B2 | 5/2004 | Foster et al. | |
| 6,752,330 B2 | 6/2004 | DiMaggio et al. | |
| 6,910,605 B2 | 6/2005 | von Schuckmann et al. | |
| 7,028,916 B2 | 4/2006 | Micheli | |
| 7,328,859 B2 | 2/2008 | Hornsby et al. | |
| 7,407,117 B2 | 8/2008 | Dodd | |
| 7,445,167 B1 | 11/2008 | Chen | |
| 7,464,887 B2 | 12/2008 | Lo | |
| 7,490,783 B2 | 2/2009 | Mueller et al. | |
| 7,775,405 B2 | 8/2010 | Sweeton et al. | |
| 7,967,171 B2 | 6/2011 | Foster et al. | |
| 7,997,449 B2 | 8/2011 | Banco et al. | |
| 8,066,155 B2 | 11/2011 | Tada | |
| 8,069,878 B2 | 12/2011 | Laible | |
| 8,104,646 B2 | 1/2012 | Foster et al. | |
| 8,177,143 B2 | 5/2012 | Laible | |
| 8,235,310 B2 | 8/2012 | Birrenkott | |
| 8,281,960 B1 | 10/2012 | Gers | |
| 8,469,291 B2 | 6/2013 | Foster et al. | |
| 8,714,415 B2 | 5/2014 | Rech et al. | |
| 8,733,342 B2 | 5/2014 | Giroux et al. | |
| 8,800,823 B2 | 8/2014 | Sweeton | |
| 8,839,991 B2 | 9/2014 | Smernoff | |
| 8,840,045 B2 | 9/2014 | Thurin et al. | |
| 2006/0102584 A1 * | 5/2006 | Wellman | B65D 41/3495 215/228 |
| 2008/0202992 A1 * | 8/2008 | Bridges | C02F 1/003 210/85 |
| 2010/0133358 A1 | 6/2010 | Gehring | |
| 2011/0147419 A1 | 6/2011 | Tada et al. | |
| 2011/0253805 A1 | 10/2011 | Lee | |
| 2011/0293481 A1 * | 12/2011 | Eanes | C02F 1/688 422/106 |
| 2012/0138544 A1 * | 6/2012 | Barani | C02F 1/688 210/744 |
| 2012/0255973 A1 | 10/2012 | Schlueter et al. | |
| 2013/0008923 A1 | 1/2013 | Syson et al. | |
| 2013/0161359 A1 | 6/2013 | Alluigi et al. | |
| 2013/0220316 A1 | 8/2013 | Oglesby et al. | |
| 2014/0061233 A1 | 3/2014 | Lang et al. | |
| 2014/0239018 A1 | 8/2014 | Maas et al. | |
| 2016/0257913 A1 * | 9/2016 | Walsh | C11D 3/0052 |

\* cited by examiner

STAND-ALONE CHEMICAL DISPENSER

CROSS-REFERENCE TO RELATED APPLICATIONS

The present application is a non-provisional of, and claims benefit and priority under 35 U.S.C. § 119(e) to U.S. Provisional Patent Application No. 61/964,668 filed on Jan. 13, 2014 and titled "STAND ALONE CHEMICAL DISPENSER", the entirety of which is hereby incorporated by reference herein.

BACKGROUND

It is often desirable to mix chemicals with water flows to produce a chemical cleaning mixture or solution, such as is often utilized in gardening, pool sanitation, and spray-cleaning applications. Devices that permit such chemical mixture creation are generally either passive dissolution devices (e.g., chemical pool tablet dissolution chambers) or in-line liquid chemical siphon devices (e.g., siphon devices for garden hoses and/or pump-style spray devices). Passive dissolution devices are generally not suitable for powered-spray applications (such as power washing for example), however, and in-line chemical siphon devices must generally be limited in size or capacity as they are suited to being disposed on hand-held spray devices that are not desirable to exceed a certain comfortable operational weight. Both types of devices are also generally difficult to utilize to readily comprehend chemical dissolution and/or mixing levels.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
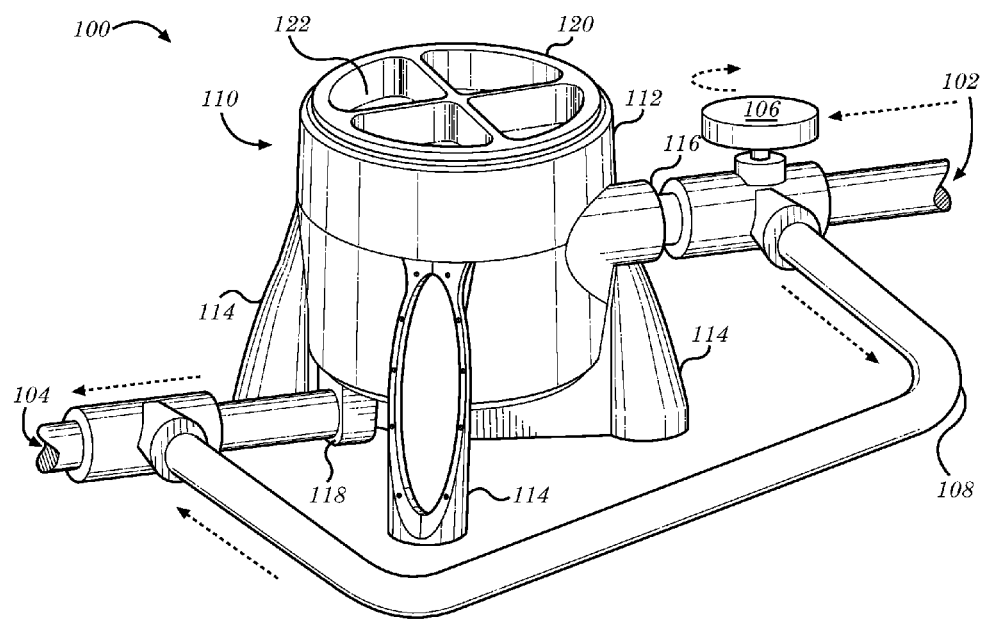
FIG. 1 is a perspective view of a stand-alone chemical dispenser system according to some embodiments.

Embodiments presented herein are descriptive of systems, apparatus, and articles of manufacture for a stand-alone chemical dispenser (and components thereof). The inventors have realized, for example, that previously available chemical mixing devices are deficient in various manners particularly with respect to power-cleaning or power-washing applications. Typical power-washing/cleaning applications utilize pre-dissolved cleaning chemicals and/or liquid solutions. The inventors have realized that if one should desire to utilize solid chemicals such as chemical tablets in power-washing/cleaning applications, neither typical passive dissolution devices nor powered-spray siphon devices are capable of providing desired benefits. Such benefits may include, but are not limited to, an ability to utilize a large or heavy chemical tablet (e.g., not suited to being disposed in a hand-held spray device; such as a cleaning agent, corrosion inhibitor, biocide, and/or odor-removing chemical tablet), an ability to have the chemical tablets dissolved in a highly-pressurized fluid flow, and/or an ability to readily discern (such as via visual inspection and/or without requiring opening or disconnection of the highly-pressurized fluid flow) an amount of remaining chemical.

In some embodiments described herein, for example, a chemical tablet (such as a chemical tablet having a diameter of at least three (3) inches) may be sealed in a stand-alone chemical dispenser housing coupled in-line with a pressurized (e.g., in the range of forty pounds per square inch (40 psi) to seventy pounds per square inch (70 psi)) or highly-pressurized (e.g., in the range of one thousand pounds per square inch (1,000 psi) to four thousand pounds per square inch (4,000 psi)) flow and may be configured with a chemical tablet dissolution indicator allowing for external visual inspection of the state of dissolution of the chemical tablet. The stand-alone chemical dispenser may, in some embodiments, be coupled in-line between a fluid supply (e.g., a water supply) at an upstream end and a high-pressure cleaning wand or gun at a downstream end.

II. Stand-Alone Chemical Dispenser Systems

Turning initially to FIG. 1, a perspective view of a stand-alone chemical dispenser system 100 according to some embodiments is shown. The stand-alone chemical dispenser system 100 may comprise, for example, a fluid input channel 102, a fluid output channel 104, and/or a fluid control valve 106 that selectively regulates the flow of a fluid (not explicitly shown in FIG. 1) through a fluid bypass channel 108 and/or to a stand-alone chemical dispenser 110. According to some embodiments, the stand-alone chemical dispenser 110 may comprise a housing 112 supported by a plurality of legs 114 (one of which being depicted as a partial cross-section cut-away in FIG. 1—e.g., to show how in some embodiments the legs 114 may be formed utilizing hollow tubes and/or may otherwise be structured to form internal voids—such as to reduce the overall weight of the stand-alone chemical dispenser 110). In some embodiments, the stand-alone chemical dispenser 110 may comprise a fluid input port 116 coupled to accept flowing fluid from fluid input channel 102. In the case that the fluid control valve 106 is selectively engaged to a first setting, for example, fluid flowing through the fluid input channel 102 may be directed into the fluid input port 116. In the case that fluid control valve 106 is selectively engaged to a second setting, fluid flowing through the fluid input channel 102 may be directed, instead, through the fluid bypass channel 108. According to some embodiments, the fluid control valve 106 may be selectively engageable to a variety of settings between the first and second settings such that varying percentages of fluid flow are directed simultaneously to each of the fluid bypass channel 108 and the fluid input port 116, respectively.

In some embodiments, the stand-alone chemical dispenser 110 may comprise a fluid output port 118 coupled to provide flowing fluid to the fluid output channel 104. Any or all fluid directed through the fluid input port 116 and into the housing 112 may, for example, be subsequently directed by the stand-alone chemical dispenser 110 to and/or through the fluid output port 118. According to some embodiments, the fluid output port 118 may be disposed at a lower elevation than the fluid input port 116 (e.g., as depicted in FIG. 1). Such a configuration may, for example, facilitate drainage of fluid from the stand-alone chemical dispenser 110.

According to some embodiments, the fluid flow from the fluid input channel 102 and into the fluid input port 116 of the stand-alone chemical dispenser 110 may comprise a pressurized flow of water (such as in a power-washing application). In some embodiments, the stand-alone chemical dispenser 110 may comprise a removable lid 120 coupled to seal an open upper portion of the housing 112 (e.g., to prevent fluid leakage during pressurized applications). The removable lid 120 may, for example, comprise a screw-on lid, cap, top, and/or other device having a threaded portion (not shown in FIG. 1) that mates and/or coupled with a threaded receiving portion of the housing 112 (also not shown in FIG. 1). According to some embodiments, the removable lid 120 may comprise a plurality of cruciform portions (four (4) as depicted in FIG. 1) forming an upper structure that is readily engageable by a human hand for easy tightening and/or loosening of the removable lid 120.

In some embodiments, the removable lid 120 may comprise a window 122 that may comprise a transparent portion of the removable lid 120. According to some embodiments, the window 122 may be disposed in the bottom of one or more of the cruciform portions of the removable lid 120. The window 122 may be utilized, for example, to allow for visual inspection of the contents of the housing 112. According to some embodiments, the housing 112 may comprise a hollow structure defining an internal volume (not explicitly shown in FIG. 1) in which flowing water may be introduced to, for example, a chemical tablet (not shown in FIG. 1). In such a manner, for example, the stand-alone chemical dispenser 110 may be utilized to transform a fluid flow from the fluid input channel 102 (and/or the fluid input port 116) into a combined fluid and chemical flow that exists via the fluid output channel 104 (and/or the fluid output port 118; e.g., for chemical cleaning applications). In such applications, the window 122 may be utilized to permit visual inspection of chemical tablet dissolution and/or degradation or depletion.

According to some embodiments, any or all of the components 102, 104, 106, 108, 110, 112, 114, 116, 118, 120, 122 of the stand-alone chemical dispenser system 100 may be similar in configuration and/or functionality to any similarly named and/or numbered components described herein. Fewer or more components 102, 104, 106, 108, 110, 112, 114, 116, 118, 120, 122 (and/or portions thereof) and/or various configurations of the components 102, 104, 106, 108, 110, 112, 114, 116, 118, 120, 122 may be included in the stand-alone chemical dispenser system 100 without deviating from the scope of embodiments described herein. In some embodiments, one or more of the various components 102, 104, 106, 108, 110, 112, 114, 116, 118, 120, 122 may not be needed and/or desired in the stand-alone chemical dispenser system 100.

Figure 2:
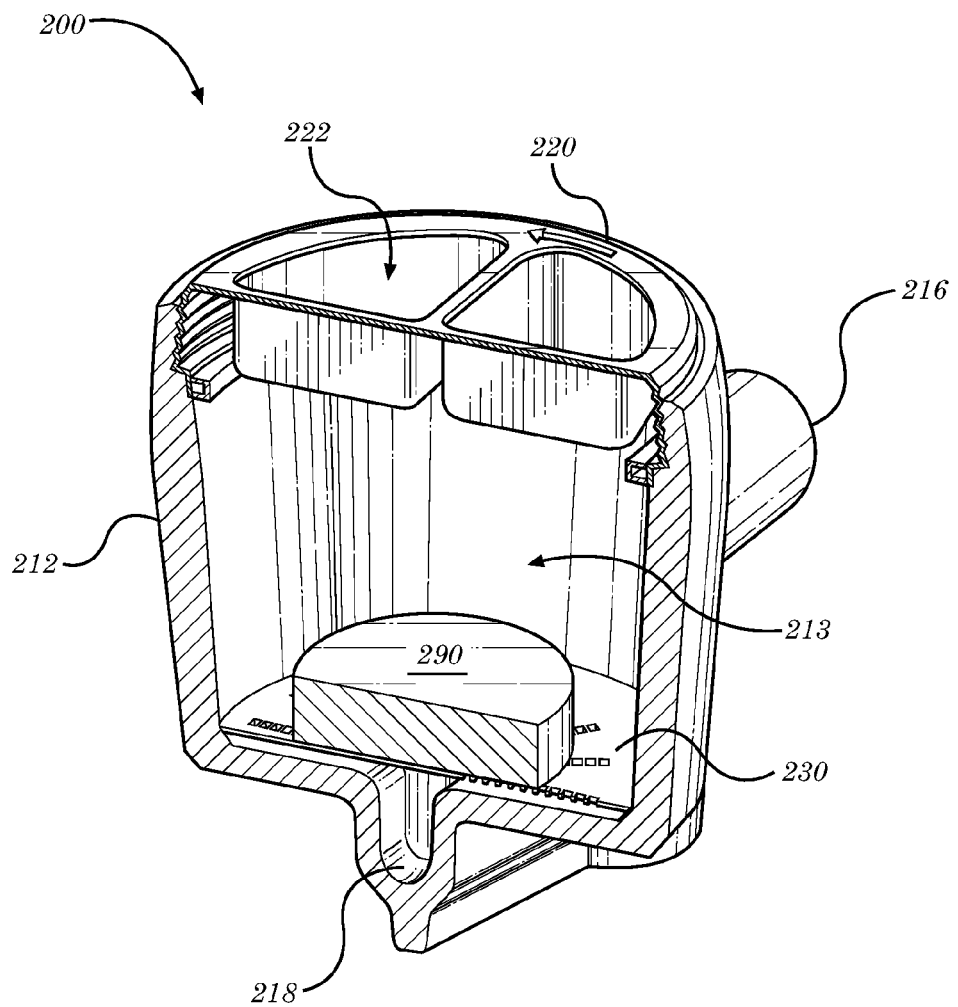
FIG. 2 is a perspective cross-sectional view of a stand-alone chemical dispenser system according to some embodiments.

Referring now to FIG. 2, a perspective cross-sectional view of a stand-alone chemical dispenser system 200 according to some embodiments is shown. The stand-alone chemical dispenser system 200 may comprise, for example, a stand-alone chemical dispenser 210 comprising a housing 212 (e.g., defining an internal cavity 213), a fluid input port 216, a fluid output port 218, and/or a removable lid 220 (e.g., comprising a window 222). In some embodiments, the stand-alone chemical dispenser system 200 as depicted in FIG. 2 may comprise a cross-sectional representation of the stand-alone chemical dispenser system 100 of FIG. 1. According to some embodiments, the fluid input port 216 and the fluid output port 218 may be in volumetric communication with the internal cavity 213 such that a fluid (not shown in FIG. 2) that flows through the fluid input port 216 may enter the internal cavity 213 and exit the internal cavity 213 via the fluid output port 218 (e.g., either pursuant to pressurized or un-pressurized flow).

According to some embodiments, the stand-alone chemical dispenser system 200 and/or the stand-alone chemical dispenser 210 may comprise a grate 230. The grate 230 may, for example, be disposed in the internal cavity 213 between the fluid input port 216 and the fluid output port 218. In such a manner, for example, a chemical tablet 290 may be disposed on an input-facing surface of the grate 230 such that the grate 230 prevents undissolved portions of the chemical tablet 290 from exiting the internal cavity 213 via the fluid output port 218. In some embodiments, the grate 230 may rest at or near the bottom of the internal cavity 213 such as by resting on the edge of a bottom bevel of the internal cavity 213, as depicted din FIG. 2. The internal cavity 213 may be cylindrically-shaped and define an internal diameter, for example, and the grate 230 may be circularly-shaped and comprise a diameter that permits the grate 230 to fit within the internal cavity 213. In some embodiments, the diameter of the grate 230 may be sized to cause one of (i) a clearance fit (or "sliding fit"; such that the grate 230 may be readily inserted and removed from the internal cavity 213), (ii) a transition fit (or "location fit"; such that amount of dislodging force must be applied to effectuate a removal of the grate 230 from the internal cavity 213), or (iii) an interference fit (such that the grate 230 may not readily be removable from the internal cavity 213). According to some embodiments, the fit of the grate 230 in the internal cavity 213 may be configured as a transition fit that permits the grate 230 to be removed (e.g., for cleaning, repair, and/or replacement) but that substantially prevents a fluid flowing through the internal cavity 213 from passing between the fit edge of the grate 230 and the walls of the internal cavity 213.

In some embodiments, a rate of dissolution and/or state of dissolution of the chemical tablet 290 may be visually inspected via the window 222 of the removable lid 220. While the chemical tablet 290 is depicted as a disc-shape or "puck" in FIG. 2, the chemical tablet 290 may comprise any style, shape, or configuration of tablets, beads, rods, granules, powders, gels, and/or other solid or semi-solid substances that are or become known or practicable. In some embodiments, a "puck" shaped (or other uniform solid shaped) chemical tablet 290 may be desirable as it may be more readily apparent from visual inspection via the window 222 how much of the chemical tablet 290 has been dissolved in a fluid flow through the internal cavity 213.

According to some embodiments, any or all of the components 210, 212, 213, 216, 218, 220, 222, 230, 290 of the stand-alone chemical dispenser system 200 may be similar in configuration and/or functionality to any similarly named and/or numbered components described herein. Fewer or more components 210, 212, 213, 216, 218, 220, 222, 230, 290 (and/or portions thereof) and/or various configurations of the components 210, 212, 213, 216, 218, 220, 222, 230, 290 may be included in the stand-alone chemical dispenser system 200 without deviating from the scope of embodiments described herein. In some embodiments, one or more of the various components 210, 212, 213, 216, 218, 220, 222, 230, 290 may not be needed and/or desired in the stand-alone chemical dispenser system 200.

Figure 3:
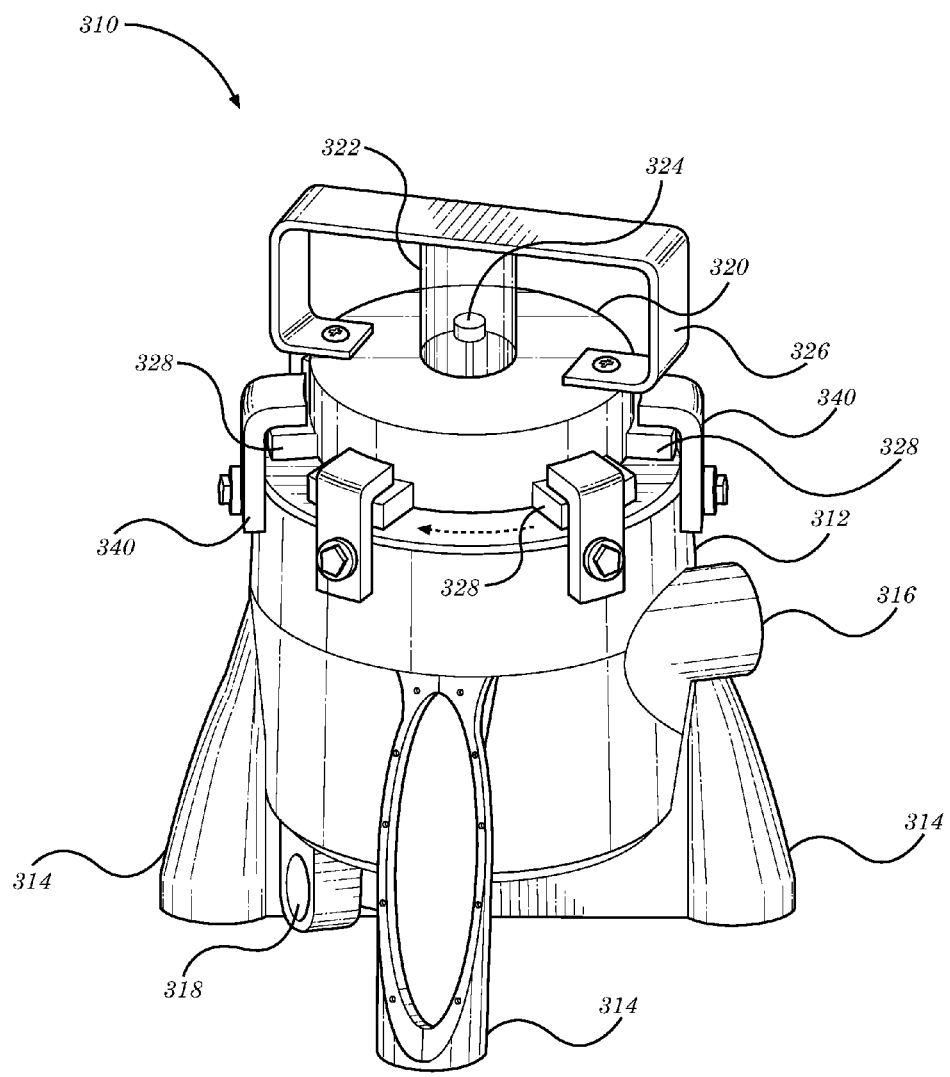
FIG. 3 is a perspective view of a stand-alone chemical dispenser according to some embodiments.

Turning now to FIG. 3, a perspective view of a stand-alone chemical dispenser 310 according to some embodiments is shown. The stand-alone chemical dispenser 310 may comprise, for example, a housing 312 supported by a plurality of legs 314 (one of which being depicted as a partial cross-section cut-away in FIG. 3—e.g., to show how in some embodiments the legs 314 may be formed utilizing hollow tubes and/or may otherwise be structured to form internal voids—such as to reduce the overall weight of the stand-alone chemical dispenser 310), a fluid input port 316, a fluid output port 318, and/or a removable lid 320. In some embodiments, the removable lid 320 may comprise a viewing tube 322 in which a status indicator 324 is disposed and/or a handle 326. The handle 326 may, for example, provide support and/or a mounting surface for the viewing tube 322 and/or may be utilized to selectively engage or disengage the removable lid 320 from the housing 312. The handle 326 may be coupled to two opposite sides of the removable lid 320, for example, and/or may form a bridge over the removable lid 320. According to some embodiments, the viewing tube 322 may comprise a first end coupled to (or covering) a hole in the removable lid 320 and a second end coupled to an underside of the bridge portion of the handle 326.

In some embodiments, the removable lid 320 may mate with the housing 312 in a bayonet and/or other locking fashion, as depicted in FIG. 3. The removable lid 320 may comprise, for example, a plurality of locking lugs 328 that may be engaged in a rotational manner with a plurality of corresponding retaining clips 340. According to some embodiments, the retaining clips 340 may be mounted in a fixed manner proximate to an upper edge of the housing 312 such that when the removable lid 320 is mated with the housing 312 (e.g., with the locking lugs 328 disposed in between the various retaining clips 340) the removable lid 320 may be rotated, causing the locking lugs 328 to slide between the upper surface of the housing 312 and engaging portions of the retaining clips 340. In some embodiments, the mating of the removable lid 320 with the housing 312 may be biased (by a biasing member not shown in FIG. 3) such that an upward force is exerted on the removable lid 320 when mated with the housing 312. The upward biasing force may, for example, cause the locking lugs 328 to exert upward pressure on the engaging (and/or retaining) portions of the retaining clips 340. In such a manner, for example, the stand-alone chemical dispenser 310 may be securely sealed which may be particularly advantageous in pressurized fluid flow applications.

According to some embodiments, any or all of the components 310, 312, 314, 316, 318, 320, 322, 324, 326, 328, 340 of the stand-alone chemical dispenser 310 may be similar in configuration and/or functionality to any similarly named and/or numbered components described herein. Fewer or more components 310, 312, 314, 316, 318, 320, 322, 324, 326, 328, 340 (and/or portions thereof) and/or various configurations of the components 310, 312, 314, 316, 318, 320, 322, 324, 326, 328, 340 may be included in the stand-alone chemical dispenser 310 without deviating from the scope of embodiments described herein. In some embodiments, one or more of the various components 310, 312, 314, 316, 318, 320, 322, 324, 326, 328, 340 may not be needed and/or desired in the stand-alone chemical dispenser 310.

Figure 4A:
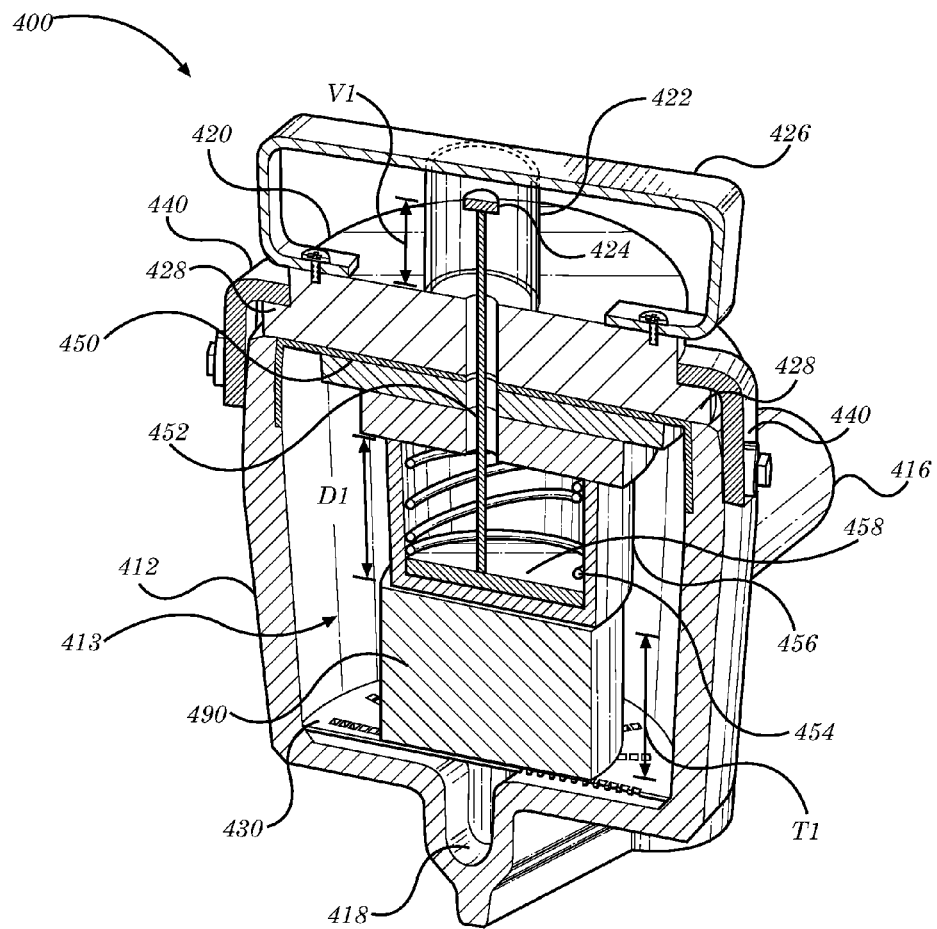
FIG. 4A is a perspective cross-sectional view of a stand-alone chemical dispenser system, shown during a first state, according to some embodiments.

Referring now to FIG. 4A, a perspective cross-sectional view of a stand-alone chemical dispenser system 400, shown during a first state, according to some embodiments is shown. The stand-alone chemical dispenser system 400 may comprise, for example, a stand-alone chemical dispenser 410 comprising a housing 412 (e.g., defining an internal cavity 413), a fluid input port 416, a fluid output port 418, and/or a removable lid 420. In some embodiments, the removable lid 420 may comprise an indicator window 422, a chemical tablet indicator 424, a handle 426, and/or one or more locking lugs 428. In some embodiments, a grate 430 may be disposed in the internal cavity 413 of the housing 412. According to some embodiments, the locking lugs 428 may be selectively fitted between an upper surface of the housing 412 and one or more retaining clips 440 (e.g., coupled to the housing 412). According to some embodiments, the removable lid 420 may comprise a gasket 450, an indicator support 452, a biasing member 454 (e.g., a spring), a diaphragm 456, and/or an indicator plate 458.

In some embodiments, the stand-alone chemical dispenser system 400 as depicted in FIG. 4 may comprise a cross-sectional representation of the stand-alone chemical dispenser 310 of FIG. 3. According to some embodiments, the fluid input port 416 and the fluid output port 418 may be in volumetric communication with the internal cavity 413 such that a fluid (not shown in FIG. 4) that flows through the fluid input port 416 may enter the internal cavity 413 and exit the internal cavity 413 via the fluid output port 418 (e.g., either pursuant to pressurized or un-pressurized flow).

According to some embodiments, the grate 430 may be disposed in the internal cavity 413 between the fluid input port 416 and the fluid output port 418. In such a manner, for example, a chemical tablet 490 may be disposed on an input-facing surface of the grate 430 such that the grate 430 prevents undissolved portions of the chemical tablet 490 from exiting the internal cavity 413 via the fluid output port 418. In some embodiments, the biasing member 454 (and/or the indicator plate 458) may force a lower surface of the diaphragm 456 to mate with an upper surface of the chemical tablet 490. The diaphragm 456 may, for example, exert a downward biasing force on the chemical tablet 490, such force tending to secure the chemical tablet 490 between the diaphragm 456 and the grate 430. As depicted in FIG. 4A, at a first time and/or pursuant to a first state of the stand-alone chemical dispenser system 400, the chemical tablet 490 may comprise a first height or thickness "T1" which causes a mating of the chemical tablet 490 and the diaphragm 456 to occur at a first location in the internal cavity 413 defined by a first level of compression of the diaphragm 456 (and the biasing member 454 thereof) represented by a first length "D1" of the diaphragm 456.

In some embodiments, the first location of the mating of the chemical tablet 490 and the diaphragm 456 may define a first location of the indicator plate 458 inside of the diaphragm 456. According to some embodiments, the indicator support 452 may be coupled to the indicator plate 458 at a first, lower end, and be coupled to the chemical tablet indicator 424 at (or proximate to) a second, upper end thereof. In such a manner, for example, the first location of the indicator plate 458 may define a first height "V1" of the chemical tablet indicator 424 above an upper surface of the removable lid 420 (e.g., inside of the indicator window 422). In some embodiments, the indicator window 422 may comprise one or more visual indication marks or gradations (not shown in FIG. 4A) such that the first height "V1" of the chemical tablet indicator 424 may be readily discerned, characterized, measured, and/or otherwise visually referenced.

Figure 4B:
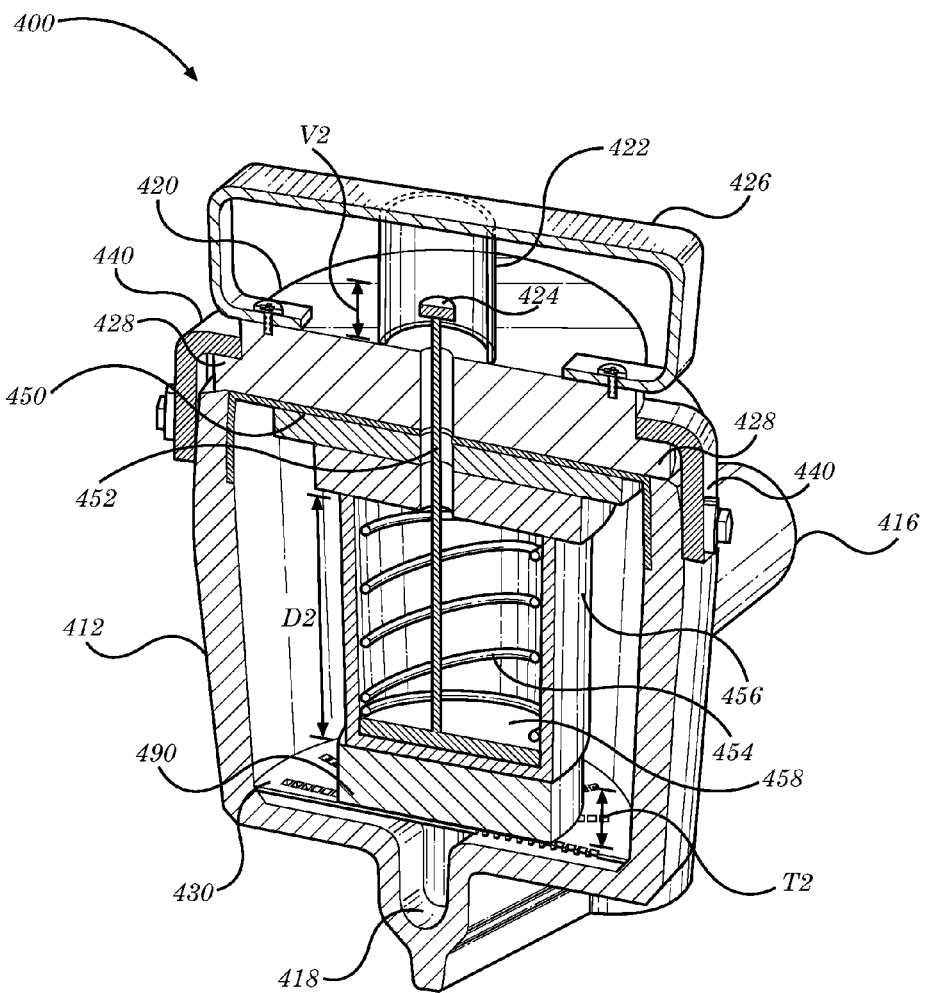
FIG. 4B is a perspective cross-sectional view of the stand-alone chemical dispenser system of FIG. 4A, shown during a second state, according to some embodiments.

Turning to FIG. 4B, a perspective cross-sectional view of the stand-alone chemical dispenser system 400 of FIG. 4A, shown during a second state, according to some embodiments is shown. As depicted in FIG. 4B, at a second time and/or pursuant to a second state of the stand-alone chemical dispenser system 400, the chemical tablet 490 may comprise a second height or thickness "T2" which causes a mating of the chemical tablet 490 and the diaphragm 456 to occur at a second location in the internal cavity 413 defined by a second level of compression of the diaphragm 456 (and the biasing member 454 thereof) represented by a second length "D2" of the diaphragm 456.

In some embodiments, the second location of the mating of the chemical tablet 490 and the diaphragm 456 may define a second location of the indicator plate 458 inside of the diaphragm 456, and accordingly may define a second height "V2" of the chemical tablet indicator 424 above the upper surface of the removable lid 420 (e.g., inside of the indicator window 422). In some embodiments, the indicator window 422 may comprise one or more visual indication marks or gradations (not shown in FIG. 4B) such that the second height "V2" of the chemical tablet indicator 424 may be readily discerned, characterized, measured, and/or otherwise visually referenced.

According to some embodiments, the second state and/or second time may occur after the first state and/or first time. The first state may occur at the first time such as upon the chemical tablet 490 being sealed into the stand-alone chemical dispenser 410 by a placement of the removable lid 420 over the internal cavity 413 and by application of a downward compressing force that causes a biasing of the diagram 456 (due to the biasing member 454) against the chemical tablet 490. The sealing of the internal cavity 413 may further comprise a compression of the gasket 450 between the housing 412 and the removable lid 420 and/or a rotational engagement of the locking lugs 428 with the retaining clips 440. In some embodiments, the retaining of the locking lugs 428 by the retaining clips 440 may permit a continued biased state between the removable lid 420 and the chemical tablet 490 and/or the housing 412. In such a manner, for example, the stand-alone chemical dispenser 410 may be sealed against pressurized fluid flows through the internal cavity 413.

In some embodiments, the second state may occur at the second time such as after a period of time during which fluid has flowed through the stand-alone chemical dispenser 410 and accordingly at least partially dissolved the chemical tablet 490. In such embodiments, the second height or thickness "T2" may be less than the first height or thickness "T1" and the second length "D2" of the diaphragm 456 may be greater than the first length "D1" of the diaphragm 456 (i.e., the diaphragm 456 may be lengthened due to a decrease in compression (from the first level of compression to the second level of compression) of the biasing member 454 due to the chemical tablet 490). In the case that the mating of the diaphragm 456 and the chemical tablet 490 occurs at the second location in the internal cavity 413 which, in some embodiments, is lower in the internal cavity 413 than the first location of the mating, the indicator plate 458, indicator support 452, and chemical tablet indicator 424 may all respectively be lower in position and/or elevation at the second time/second state than at the first time/first state. The second height "V2" of the chemical tablet indicator 424 at the second time/second state may, for example, be lower in the indicator window 422 than the first height "V1" of the chemical tablet indicator 424 at the first time/first state. In such a manner, for example, a visual comparison of the second height "V2" and the first height "V1" of the chemical tablet indicator 424 may indicate that the chemical tablet 490 has dissolved by a first amount, degree, and/or percentage.

According to some embodiments, other types of chemical dissolution indicators may also or alternatively be utilized. As a pressure reading of a pressurized fluid flow through the internal cavity 413 may change depending upon the state of dissolution of the chemical tablet 490, for example, a pressure gage (not shown) coupled to measure the pressure in the internal cavity 413 may be utilized in some embodiments as an indicator of a level of dissolution of the chemical tablet 490. According to some embodiments, the chemical tablet 490 may be formulated to release a dye or color upon reaching one or more states or levels of dissolution. The chemical tablet 490 may comprise a dyed core or internal layer (not shown), for example, that when exposed to the fluid flow releases a color or other indicator representing a state of dissolution of the chemical tablet 490 that has reached the internal core or layer (e.g., a warning layer).

In some embodiments, the diagram 456 may comprise a flexible shroud or housing as depicted in FIG. 4A and FIG. 4B, such as to prevent fouling and/or impingement of the biasing member 454 (and/or other moving parts) due to fluid in the fluid flow and/or debris, sediment, and/or other objects therein. The diagram 456 may, in some embodiments, comprise a piston or piston-like device coupled to drive the indicator support 452. In some embodiments, the indicator support 452 may comprise a rod, wire, and/or other device coupled to the diaphragm 456 (and/or piston) and/or the indicator plate 458 such that vertical movement of the diaphragm 456 (and/or piston) and/or the indicator plate 458 causes the indicator support 452 to transfer forces to the chemical tablet indicator 424 (e.g., by directly moving the chemical tablet indicator 424 up and/or down within the indicator window 422). In some embodiments, the removable lid 420 may, instead of being removable, be coupled to the housing 412 utilizing a hinge (not shown) and/or latch such that the lid 420 may be pivoted, rotated, and/or swung or otherwise moved out of position covering the entrance to the internal cavity 413 to an open position such that access to the internal cavity 413 may be granted, regardless of whether the lid 420 becomes partially or fully detached from the housing 412.

According to some embodiments, any or all of the components 410, 412, 413, 416, 418, 420, 422, 424, 426, 428, 430, 440, 450, 452, 454, 456, 458, 490 of the stand-alone chemical dispenser system 400 may be similar in configuration and/or functionality to any similarly named and/or numbered components described herein. Fewer or more components 410, 412, 413, 416, 418, 420, 422, 424, 426, 428, 430, 440, 450, 452, 454, 456, 458, 490 (and/or portions thereof) and/or various configurations of the components 410, 412, 413, 416, 418, 420, 422, 424, 426, 428, 430, 440, 450, 452, 454, 456, 458, 490 may be included in the stand-alone chemical dispenser system 400 without deviating from the scope of embodiments described herein. In some embodiments, one or more of the various components 410, 412, 413, 416, 418, 420, 422, 424, 426, 428, 430, 440, 450, 452, 454, 456, 458, 490 may not be needed and/or desired in the stand-alone chemical dispenser system 400.

III. Conclusion

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant(s) reserves the right to file additional applications to pursue patents for subject matter that has been disclosed and enabled, but not claimed in the present application.

What is claimed is:

1. A stand-alone chemical dispenser for a pressurized water flow to dissolve a chemical tablet, thereby providing a chemical cleaning solution for pressurized cleaning applications, comprising:
   a housing defining an internal cavity, the internal cavity having an opening at the top of the housing;
   a pressurized fluid inlet coupled to a side of the housing and being in volumetric communication with the internal cavity;
   a fluid outlet disposed at the bottom of the internal cavity and also being in volumetric communication with the internal cavity;
   a grate disposed in the internal cavity and disposed between the fluid inlet and the fluid outlet; and
   a removable lid coupled to seal the opening of the internal cavity by mating with the housing, the removable lid comprising (i) a biasing element that exerts a force upon a chemical tablet disposed within the internal cavity, (ii) a plurality of locking lugs that when rotated while the removable lid is biased against the chemical tablet are engaged with a plurality of corresponding retaining clips coupled to the housing, (iii) a chemical tablet indicator disposed within a chemical tablet indicator window, and (iv) a handle coupled to two opposite sides of the removable lid, the handle forming a bridge over the removable lid and the chemical tablet indicator window comprising a clear tube having a first end mounted through a hole in the removable lid and a second end coupled to an underside of the bridge of the handle.

2. The stand-alone chemical dispenser of claim 1, wherein the chemical tablet indicator window comprises a magnified window.

3. The stand-alone chemical dispenser of claim 2, wherein the chemical tablet indicator is in communication with the biasing element such that a change in height of the chemical tablet upon which the biasing element exerts the force is represented by a change in position of the chemical tablet indicator.

4. The stand-alone chemical dispenser of claim 2, further comprising:
   a plurality of leg supports coupled to the housing and supporting the housing for stable positioning on a horizontal surface.

5. The stand-alone chemical dispenser of claim 1, wherein the removable lid further comprises a diaphragm housing the biasing element.

6. The stand-alone chemical dispenser of claim 1, further comprising:
   a pressure gage coupled to sense a pressure within the internal cavity.

* * * * *